A. W. & J. B. DODGE.
VENEER LATHE.
APPLICATION FILED JUNE 30, 1911.
1,012,995.
Patented Dec. 26, 1911.
2 SHEETS—SHEET 1.
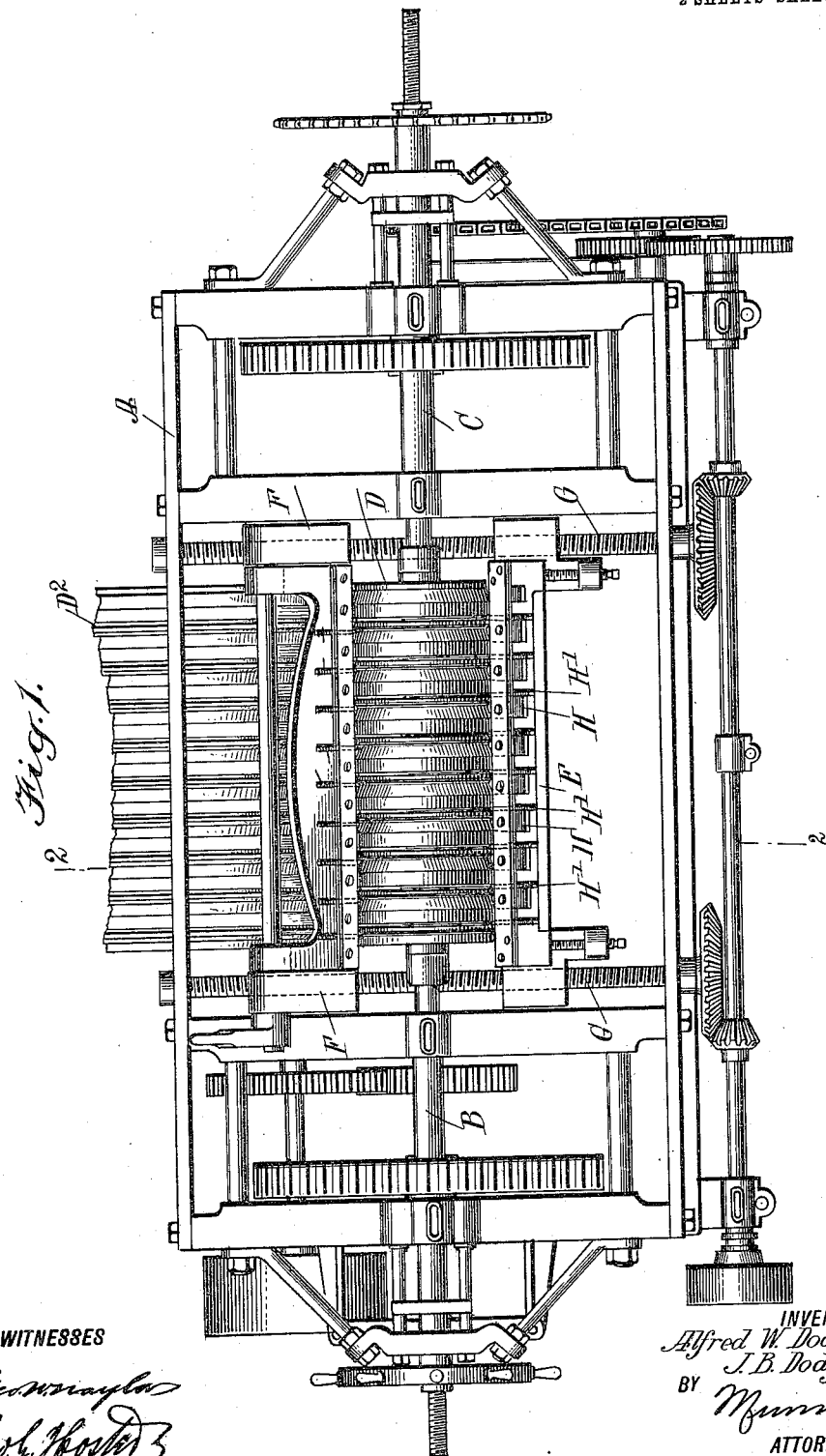
WITNESSES
INVENTORS
Alfred W. Dodge
J. B. Dodge
BY
ATTORNEYS

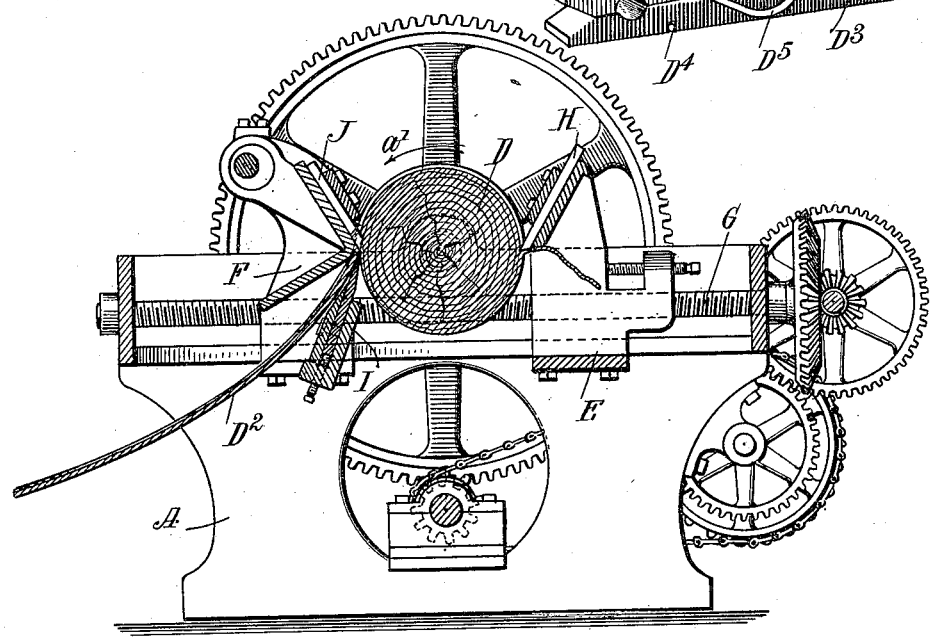
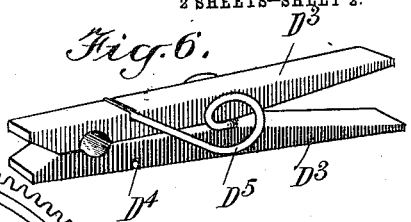
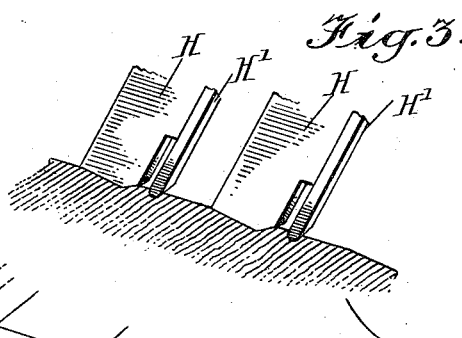
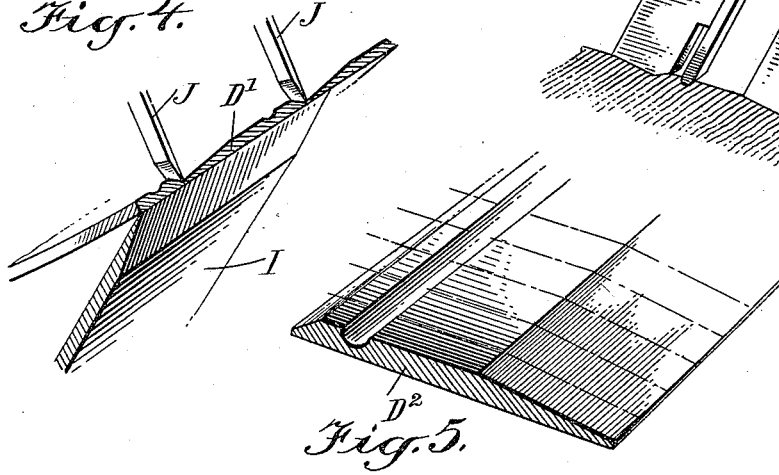

UNITED STATES PATENT OFFICE.

ALFRED W. DODGE AND J. B. DODGE, OF COUDERSPORT, PENNSYLVANIA.

VENEER-LATHE.

1,012,995.   Specification of Letters Patent.   Patented Dec. 26, 1911.

Application filed June 30, 1911. Serial No. 636,218.

*To all whom it may concern:*

Be it known that we, ALFRED W. DODGE and J. B. DODGE, both citizens of the United States, and residents of Coudersport, in the county of Potter and State of Pennsylvania, have invented a new and Improved Veneer-Lathe, of which the following is a full, clear, and exact description.

The invention relates to woodworking machinery, and its object is to provide a new and improved veneer lathe for cutting veneers from a revolving log, and having a cross section corresponding in shape to the article to be produced, such, for instance, as the clamping members of spring-pressed clothes pins. For the purpose mentioned, use is made of means for supporting and rotating a log, shaping cutters for engaging with the peripheral face of the log to shape the same according to a predetermined pattern, a peeling cutter for peeling off a shaped veneer from the log, and slitting cutters for cutting the veneer lengthwise into strips.

A practical embodiment of the invention is represented in the accompanying drawings forming a part of this specification, in which similar characters of reference indicate corresponding parts in all the views.

Figure 1 is a plan view of a veneer lathe for producing ornamental veneers to be cut up into pieces for use as clamping members of spring-pressed clothes pins; Fig. 2 is a transverse section of the same on the line 2—2 of Fig. 1; Fig. 3 is a sectional perspective view of the shaping cutters in position on the peripheral face of the log; Fig. 4 is a sectional perspective view of the peeling and slitting cutters in position on the veneer; Fig. 5 is a sectional perspective view of one of the veneer strips; and Fig. 6 is a perspective view of a clothes pin having clamping members cut from the veneer strip.

On a suitably constructed frame A are mounted to turn and to slide the alined spindles B and C for engagement with the ends of a log D supported on the said spindles and rotated by the same in the direction of the arrow $a'$ shown in Fig. 2. On opposite sides of the log D are mounted to slide toward and from each other tool carriers E and F, engaged by right-hand and left-hand threaded screw rods G, journaled in suitable bearings arranged on the main frame A. The tool carrier E adjustably supports sets of shaping cutters H, H', adapted to engage the peripheral face of the log D, so as to shape the same according to the shape to be given to the article, and on the tool carrier F is adjustably mounted peeling cutters I for engagement with the log D, so as to cut from the same a veneer D', the outer face of which is shaped according to the shape given to the veneer by the shaping cutters H, H'. On the carrier F are also adjustably mounted slitting cutters J adapted to slit the veneer D' into strips $D^2$, having a width corresponding to the length of the clamping member of the clothes pins to be made, it being understood that such strip $D^2$ is cut transversely into pieces having a width corresponding to the clamping members of the clothes pins, as will be readily understood by reference to Figs. 5 and 6. The lines in Fig. 5 indicate the cuts for cutting the strips $D^2$ into pieces. By reference to Fig. 2, it will be noticed that the cutters H, H' incline downwardly and inwardly, while the peeling cutters I are inclined upwardly and inwardly, and the slitting cutters J are inclined downwardly and inwardly, and their cutting edges operate in conjunction with the cutting edges of the peeling cutters I, so that the veneer cut from the log by the cutters I is immediately slit lengthwise to form the strips $D^2$.

The means for rotating the spindles B and C, and the means for imparting a rotary motion to the screw rods G are the same as those now generally used in veneer lathes, and hence it is not deemed necessary to describe the said means in detail.

It is understood that when the machine is running the log D is turned in the direction of the arrow $a'$, and the shaping cutters H, H' cut into the peripheral face of the log D at one side thereof, so as to give a predetermined shape to this peripheral face, and the peeling cutters I acting on the opposite side of the log D cut a veneer off the log and at the same time the slitting cutters J cuts the veneer into strips $D^2$. The strips $D^2$ are subsequently cut by a separate machine into pieces $D^3$, each provided with grooves $D^4$ for engagement by the ends of a spring $D^5$, which with two pieces $D^3$ completes the spring-pressed clothes pin, as will be readily understood by reference to Fig. 6.

Having thus described our invention, we claim as new and desire to secure by Letters Patent:

A veneer lathe, comprising a frame, revoluble spindles journaled in the frame for supporting and rotating a log, tool carriers on opposite sides of the log, feed screws for feeding the said tool carriers simultaneously toward each other, shaping cutters mounted on one of the tool carriers for engagement with the peripheral face of the log to shape the latter, a peeling cutter mounted on the other tool carrier for peeling off a shaped veneer from the log, and slitting cutters arranged on the tool carrier supporting the said peeling cutter and stationary with respect to the latter, the said slitting cutters and peeling cutter standing at an angle one to the other and the former engaging the veneer peeling after its detachment, and as it passes between the slitting cutters and the peeling cutter, whereby to utilize the latter as a bearing point for the former.

In testimony whereof we have signed our names to this specification in the presence of two subscribing witnesses.

ALFRED W. DODGE.
J. B. DODGE.

Witnesses:
SANFORD H. LEWIS,
WALTER L. ALLEN.

Copies of this patent may be obtained for five cents each, by addressing the "Commissioner of Patents, Washington, D. C."